United States Patent [19]

Greenspan et al.

[11] Patent Number: 5,739,786
[45] Date of Patent: Apr. 14, 1998

[54] GPS TRANSFER INITIALIZATION SYSTEM

[75] Inventors: Richard L. Greenspan, Newton; Joseph M. Przyjemski, Carlisle, both of Mass.

[73] Assignee: The Charles Stark Draper Laboratory, Inc., Cambridge, Mass.

[21] Appl. No.: 661,983

[22] Filed: Jun. 12, 1996

[51] Int. Cl.⁶ .............................. H04B 7/185; G01S 5/02
[52] U.S. Cl. ........................................................ 342/357
[58] Field of Search ........................ 342/357; 364/449.7, 364/449.9

[56] References Cited

U.S. PATENT DOCUMENTS 5,319,374  6/1994  Desai et al. ............................. 342/357
5,510,797  4/1996  Abraham et al. ...................... 342/352

*Primary Examiner*—Theodore M. Blum
*Attorney, Agent, or Firm*—Iandiorio & Teska

[57] ABSTRACT

A GPS transfer initialization system for initializing a mobile unit from a base unit, includes a GPS receiver in the mobile unit for receiving a GPS signal including a time register, a frequency register, and a GPS reference oscillator for generating a GPS carrier signal of a first frequency; a mobile transmitter/receiver circuit on the mobile unit responsive to the GPS carrier signal, for generating and transmitting a transfer carrier signal of a second frequency that is a multiple of the first frequency; a base transmitter/receiver circuit on the base unit including a GPS calibrated frequency and time reference for providing a GPS calibrated signal of a third frequency; an error detection circuit for comparing the GPS calibrated signal and the transfer carder signal to generate a frequency error signal determined from the difference between them and representative of the error in the frequency of the GPS reference oscillator; and an error correction circuit responsive to the GPS calibrated frequency and time reference and to the error detection circuit for generating and transmitting the GPS time and error signal; the mobile transmitter/receiver circuit including an initializing circuit responsive to the GPS time and the error signal for adjusting the time register and frequency register to the correct GPS time and frequency.

6 Claims, 3 Drawing Sheets

GPS TRANSFER INITIALIZATION SYSTEM

FIELD OF INVENTION

This invention relates to a Global Positioning System (GPS) Transfer Initialization System for initializing a mobile GPS receiving unit from a base GPS receiving unit.

BACKGROUND OF INVENTION

The Global Positioning System (GPS) employs a collection of medium altitude satellites each of which continuously emits a unique pseudo-random code modulated radio frequency (RF) carrier. A GPS user operates a GPS receiver that is capable of measuring the transit time for the RF signals propagating from four or more GPS satellites to the user's antenna. The measured transit times are converted to equivalent distances within the receiver's navigation processor; the user's position is determined from the measured distances to any four or more satellites that do not all lie in one plane. GPS determined positions can be used to guide missiles and projectiles precisely to target coordinates thereby minimizing the number of rounds that must be fired to obtain the desired level of lethality.

The coded GPS signals as received by terrestrial users are of very low amplitude; they are substantially weaker than the typical front end noise of a receiver. Thus, substantial intervals of time or sophisticated circuitry or both is required to enhance the received satellite signals to the level where they can be distinguished from the background noise. The low input signal power also makes the operation of a GPS receiver vulnerable to unsophisticated jamming, which needs only to use high power noiselike signals to overwhelm the GPS receiving system. Jamming resistance can be increased within the GPS receiver once the GPS signals are acquired; however, the initial satellite signal acquisition is especially vulnerable to jamming. This is a particular concern for the application of GPS to navigate gun fired projectiles whose flight time to target is relatively short, usually no more than one to five minutes. Although acquisition performance can be improved by using more sophisticated circuitry, that is not an option in this application because it would require a larger and more expensive receiver than is acceptable in a projectile whose volume available for electronics is limited and whose cost must be affordable.

One prior approach to mechanize rapid GPS acquisition has involved using a GPS receiver mounted on or near the weapon delivery platform. This receiver has ample room for sophisticated parallel processing circuitry and the time to acquire the satellite signal before the weapon is fired. The GPS satellite signals being tracked by this receiver would then be transferred to the projectile over a fiber optic link which pays out for a distance long enough to permit the projectile receiver to quickly lock on to the satellite signal, before the link breaks off. In another prior application, weapons carried in aircraft bomb bays are provided with the means to connect their GPS receivers via cable to a GPS antenna mounted on the aircraft. By this means the GPS receiver can acquire and maintain synchronization with the GPS satellite signals while on the bomb bay. After the missile is launched clear of the bomb bay it breaks the cable link to that antenna and begins using its own antenna. The cost of providing the cable link is considered to be so high that the Air Force is reluctant to invest in these modifications. In yet another approach a pseudo satellite broadcasts high power L-band, GPS-like signals from a location that is close enough to the projectile so that these signals are detectable even in the presence of jamming. This latter approach suffers from the fact that GPS antennas that can be installed on small projectiles are relatively non-directive. Therefore the projectile is vulnerable to jamming arriving from any direction. It is also impractical to use highly directional pseudolites to increase the margin against jammers. Unless the pseudolite is closer to the weapon than the jammer by a factor of ten or more, the pseudolite signals will have little or no margin against a high power jammer.

An additional problem that is unique to GPS guided projectiles is that, under the initial acceleration of the projectiles, which is typically 6,000–30,000 g's or higher, the GPS receiver's reference frequency which is typically derived from a stable crystal clock is shifted by a large and unpredictable amount thereby increasing the range of frequency uncertainty that must be searched during GPS signal acquisition. Even when using fiber optic cable links or other means of directly transferring the GPS satellite synchronization from the platform to the projectile, the initial g shock from firing would shift the clock frequency of the weapon enough that the synchronization would be lost and reacquisition would still be required.

SUMMARY OF INVENTION

It is therefore an object of this invention to provide a GPS Transfer Initialization System.

It is a further object of this invention to provide such a GPS Transfer Initialization System for initializing a mobile unit from a base unit.

It is a further object of this invention to provide a GPS Transfer Initialization System which enables fast acquisition of a GPS signal even without parallel processing.

It is a further object of this invention to provide a GPS Transfer Initialization System which requires little additional circuitry within the mobile unit.

It is a further object of this invention to provide a GPS Transfer Initialization System which has much improved resistance to jamming.

It is a further object of this invention to provide a GPS Transfer Initialization System which compensates for temperature and shock induced frequency shifts of the reference oscillator in the mobile unit.

It is a further object of this invention to provide a GPS Transfer Initialization System which uses a millimeter wave r.f. link which requires smaller antennas while providing higher directionality and reduced susceptibility to jamming than L-band GPS pseudolites.

It is a further object of this invention to provide a GPS Transfer Initialization System which requires no mechanical linkage or interconnection.

It is a further object of this invention to provide a GPS Transfer Initialization System in which the r.f. link is itself extremely jam resistant and which also renders the GPS receiver on the mobile unit less vulnerable to jamming by virtue of fast, reliable acquisition of the GPS signal.

The invention results from the realization that a truly fast-acquisition, simpler, more jam-proof GPS receiver, especially useful for initializing mobile units, can be achieved with a transfer initialization system that transmits an initialization signal from the base unit to a mobile unit and that this initialization signal should provide a timing and frequency reference for the mobile unit; and that the mobile unit can determine the frequency offset of its internal reference oscillator by comparison with the initialization signal and that it may directly correct this offset; and that the initialization signal may be substantially less susceptible to jamming than the navigation signals broadcast by GPS satellites. Alternatively, the projectile may downlink a signal containing the offset to the base station which may command the appropriate change to bring the mobile unit reference frequency into synchronism with GPS satellite signals.

This invention features a GPS transfer initialization system for initializing a mobile unit from a base unit. There is a GPS receiver in the mobile unit for receiving a GPS signal including a time register, a frequency register, and a GPS reference oscillator for generating a GPS carrier signal of a first frequency. There is a mobile transmitter/receiver circuit on the mobile unit responsive to the GPS carrier signal, for generating and transmitting a transfer carrier signal of a second frequency that is a multiple of the first frequency. A base transmitter/receiver circuit on the base unit includes a GPS calibrated frequency and time reference for providing a GPS calibrated signal of a third frequency; an error detection circuit for comparing the GPS calibrated signal and the transfer carrier signal to generate a frequency error signal determined from the difference between them and representative of the error in the frequency of the GPS reference oscillator; and an error correction circuit responsive to the GPS calibrated frequency and time reference and to the error detection circuit for generating trod transmitting the GPS time and the error signal. The mobile transmitter/receiver circuit also includes an initializing circuit responsive to the GPS time and the error signal for adjusting the time register and frequency register to the correct GPS time and frequency.

In a preferred embodiment the mobile unit may include an ordinance projectile. The mobile transmitter/receiver circuit may include a directional antenna, as may the base transmitter/receiver. The second frequency transfer carder signal may be approximately 30–300 GHz, and more particularly may be in the 50–60 GHz range.

DISCLOSURE OF PREFERRED EMBODIMENT

Other objects, features and advantages will occur to those skilled in the art from the following description of a preferred embodiment and the accompanying drawings, in which.

Figure 1:
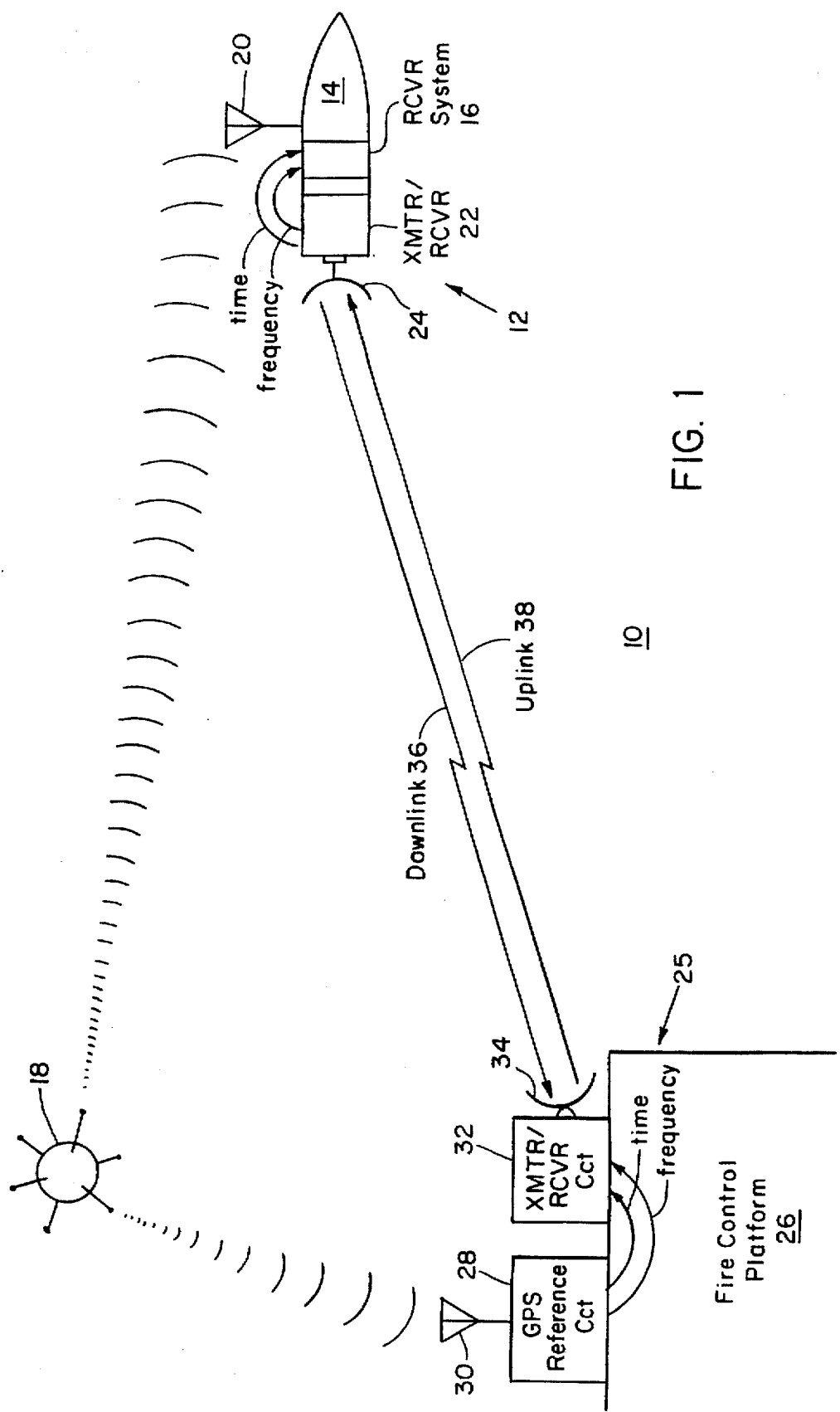
FIG. 1 is a schematic diagram of a GPS transfer initialization system according to this invention.

There is shown in FIG. 1 a GPS transfer initialization system 10 according to this invention including a mobile unit 12 on board a projectile 14 or other ordinance device. There is a GPS receiver system 16 which receives signals from four or more GPS satellites 18 at a typical frequency of 1.57542 GHz over antenna 20. Also on mobile unit 12 is transmitter/receiver circuit 22 which transmits and receives via antenna 24. Base unit 25 on platform 26 includes GPS reference circuit 28 that receives signals from satellite 18 and three or more other satellites via antenna 30. Also included on base unit 25 is transmitter/receiver circuit 32 which communicates with transmitter/receiver circuit 22 on mobile unit 12 via antenna 34 and antenna 24.

In one mode of operation, when mobile unit 12 leaves base unit 25 it transmits back a signal from antenna 24 over downlink path 36 to antenna 34. This signal. is in the range of 30–300 GHz where it is very difficult to generate sufficient power for jamming the link; this is in contrast to the GPS signal frequency range of 1.57542 GHz, where many thousands of watts of power can be generated for jamming purposes. In addition, a carrier wave transmitted from antenna 24 to antenna 34 on the downlink path 36 in the 40–60 GHz range, will be more difficult to jam because absorption interaction with oxygen molecules along the propagation path causes high attenuation of jammers at large distances from the mobile station, whereas the distance from the base station to the mobile unit is relatively small.

Transmitter/receiver circuit 32 receives the carrier signal on downlink path 36, compares that with GPS reference signals to determine any error between the carrier signal in mobile unit 12 and the real frequency of the GPS system. There will normally be a significant difference because of the g forces, typically in the range of 6,000–30,000 g's, which exert stresses on the clock crystal and on the mechanical structure supporting the clock crystal that cause the clock crystal to change its oscillation frequency. The difference in frequency detected by a transmitter/receiver circuit 32 is provided by antenna 34 back along uplink path 38 via antenna 24 to transmitter/receiver circuit 22 on board mobile unit 12, along with an accurate time derived directly from the GPS system 28. These two values can be used to correct the frequency and the time in the mobile unit. The most direct means is as follows: Contemporary GPS receive, receivers routinely include the means to accept external frequency and time reference inputs. In the present invention the transfer alignment is used to correct the frequency of the GPS receiver's external frequency reference (thereby requiring no alteration of the receiver hardware), and the timing information is input directly to the receiver using the standard interfaces with no more than minor software changes. Using these means the GPS receiver on mobile unit 12, within a few seconds after projectile 14 leaves the muzzle, will be closely synchronized to GPS time and frequency so that it will quickly acquire the GPS signal thereby allowing it to strike its target coordinates with great accuracy.

In another variation, the base station generates a reference frequency that is modulated by GPS timing information that is accurate to better than 100 ns, and is offset by a frequency increase that precisely cancels the apparent frequency decrease attributable to Doppler shift (time varying path length) along the line of sight from the base station to the mobile GPS user. This has the effect of providing the mobile receiver with precise timing and the means to synchronize on board reference to its nominal resting value.

Figure 2:
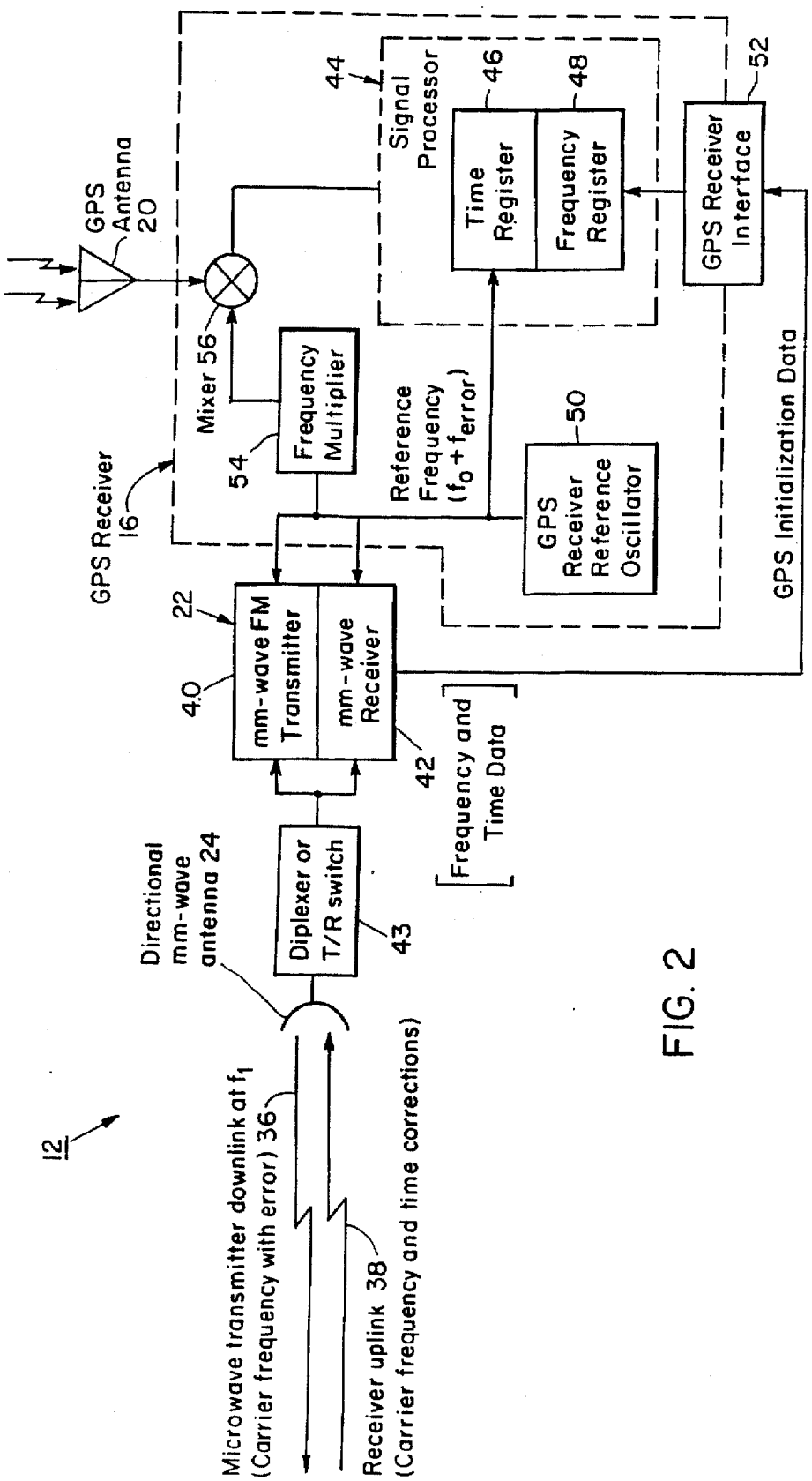
FIG. 2 is a schematic block diagram of the mobile unit of the system of FIG. 1.

Transmitter/receiver circuit 22 includes transmitter 40, FIG. 2, and receiver 42 a diplexer or transmit/receive switch 43. GPS receiver system 16 includes signal processor 44 including time register 46 and frequency register 48. GPS receiver systems 16 also includes GPS receiver reference oscillator 50 and GPS receiver interface 52. Also included are frequency multiplier 54 and mixer 56.

In operation, when ordinance or projectile 14 leaves the muzzle a carrier signal in the range of 30–300 GHz is generated by GPS receiver reference oscillator 50 and delivered to both transmitter 40 and receiver 42. GPS receiver reference oscillator generates a reference signal which is delivered to transmitter 40 and receiver 42. In transmitter 40 a frequency multiplier 58 converts the reference to some higher multiple carrier in the range of 30–300 GHz. With diplexer or switch 43 set to the transmit position, that carder signal is transmitted by antenna 24 along pathway 36. At the same time that the reference is being generated by oscillator 50 and delivered to transmitter440 and receiver 42, it is also being delivered to time register 46 and frequency register 48 and to frequency multiplier 44 which provides the signal to mixer 56 that is used to downconvert the incoming GPS signal on antenna 20 and deliver it to signal processor 44 in a well-known manner with respect to GPS.

Figure 3:
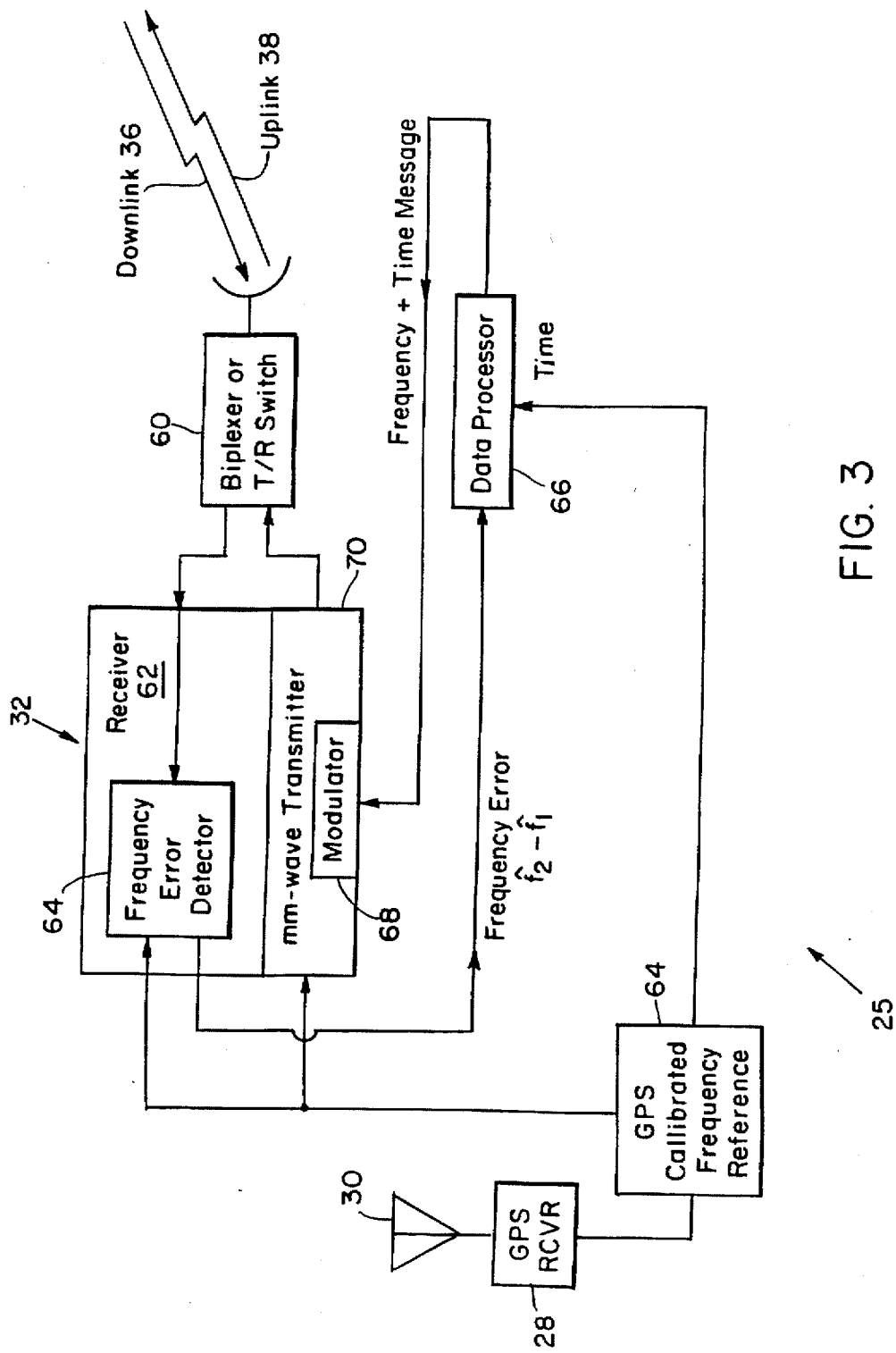
FIG. 3 is a schematic block diagram of the base unit of FIG. 1.

Once the carrier signal on downlink pathway 36 reaches antenna 34 it is passed through diplexer or transmit/receive switch 60, FIG. 3, to receiver 62 of transmitter/receiver circuit 32. There it is compared with GPS calibrated frequency reference 64 derived from the GPS receiver 28 in frequency error detector 64. Here any difference in frequency, such as by the g forces experienced by the clock crystal, are detected and delivered to processor 66 which provides a correction signal to adjust the frequency of the clock in transmitter/receiver circuit 22, FIG. 2, on mobile unit 12. GPS calibrated frequency/time reference 64, FIG. 3, also provides time directly derived from the GPS system through GPS receiver 28. The time is also provided to processor 66 which produces a combined signal indicating the correct time and the frequency adjustment required to bring the frequency to the correct value to modulator 68 in transmitter 70. Transmitter 70 now emits the carrier signal in the 30 to 300 GHz range through switch 60 which carries the correct time and the frequency adjustment in accordance with the GPS system signals. This carrier is dispatched by antenna 34 along uplink pathway 38 to antenna 24, FIG. 2, on mobile unit 12 where switch 43 directs the signal to receiver 42. Receiver 42 detects and delivers the frequency adjustment signal and the time data to GPS receiver interface 52 which then adjusts the frequency in register 48 and places the correct time in register 46 so that the on-board mobile unit 16 can quickly acquire the signal from the Global Positioning System, lock onto it, and steer precisely toward its target coordinates.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A GPS Transfer Initialization System for initializing a mobile unit from a base unit, comprising:

a GPS receiver in the mobile unit for receiving a GPS signal including a time register, a frequency register, and a GPS reference oscillator for generating a GPS carrier signal of a first frequency;

a mobile transmitter/receiver circuit on said mobile unit responsive to said GPS carrier signal, for generating and transmitting a transfer carder signal of a second frequency that is a multiple of said first frequency;

a base transmitter/receiver circuit on the base unit including:

a GPS calibrated frequency and time reference for providing a GPS calibrated signal of a third frequency;

an error detection circuit for comparing said GPS calibrated signal and said transfer cartier signal to generate a frequency error signal determined from the difference between them and representative of the error in the frequency of said GPS reference oscillator; and an error correction circuit responsive to said GPS calibrated frequency and time reference and to said error detection circuit for generating and transmitting the GPS time and said error signal;

said mobile transmitter/receiver circuit including an initializing circuit responsive to said GPS time and said error signal for adjusting said time register and frequency register to the correct GPS time and frequency.

2. The GPS transfer initialization system of claim 1 in which the mobile unit is included on an ordinance projectile.

3. The GPS transfer initialization system of claim 1 in which said base transmitter/receiver circuit includes a directional antenna.

4. The GPS transfer initialization system of claim 1 in which said mobile transmitter/receiver circuit includes a directional antenna.

5. The GPS transfer initialization system of claim 1 in which said second frequency transfer carrier signal is approximately 30–300 GHz.

6. The GPS transfer initialization system of claim 1 in which said second frequency transfer carrier signal is approximately 40–60 GHz.

* * * * *